R. D. WEBB.
PRESS.
APPLICATION FILED JAN. 19, 1918.

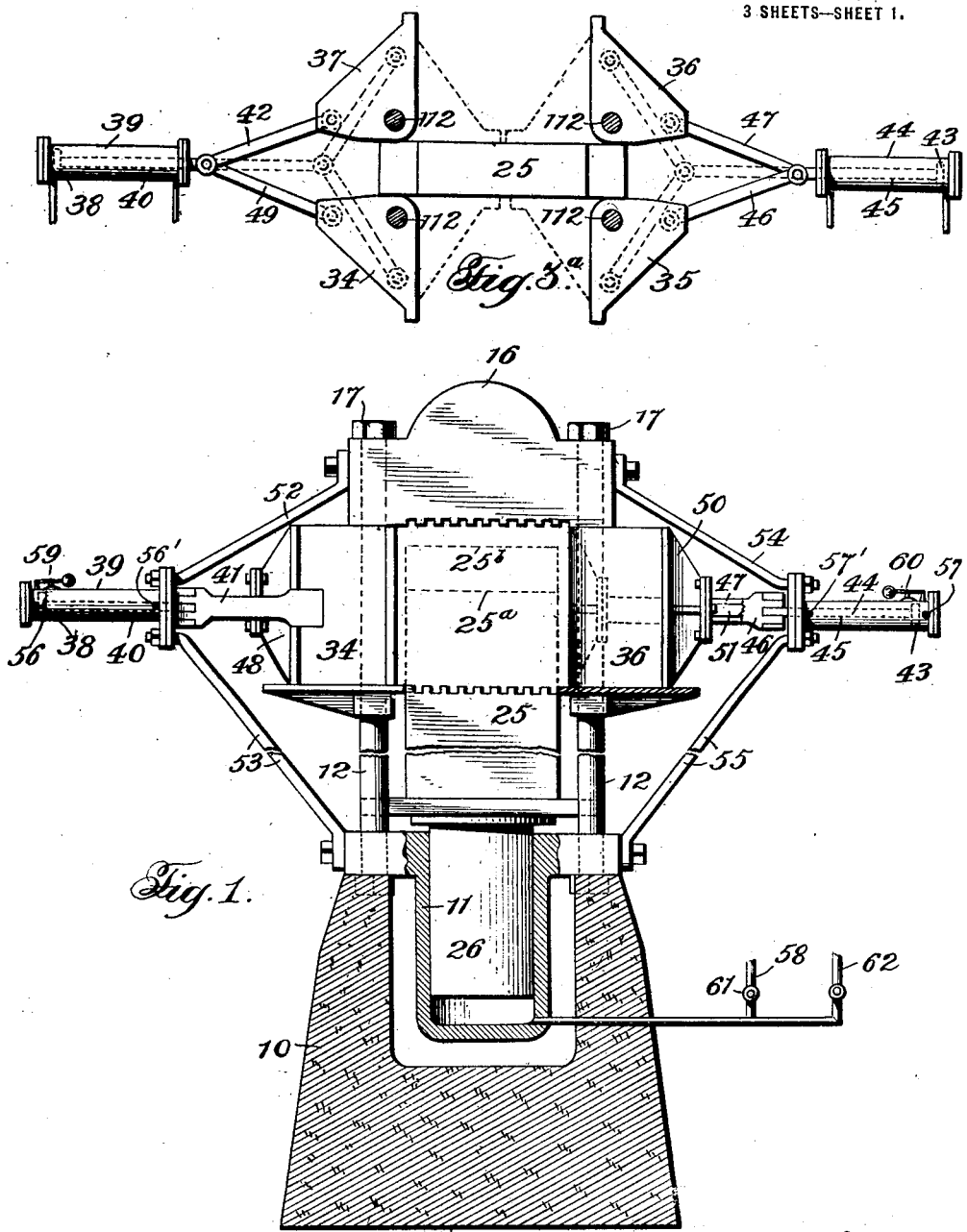

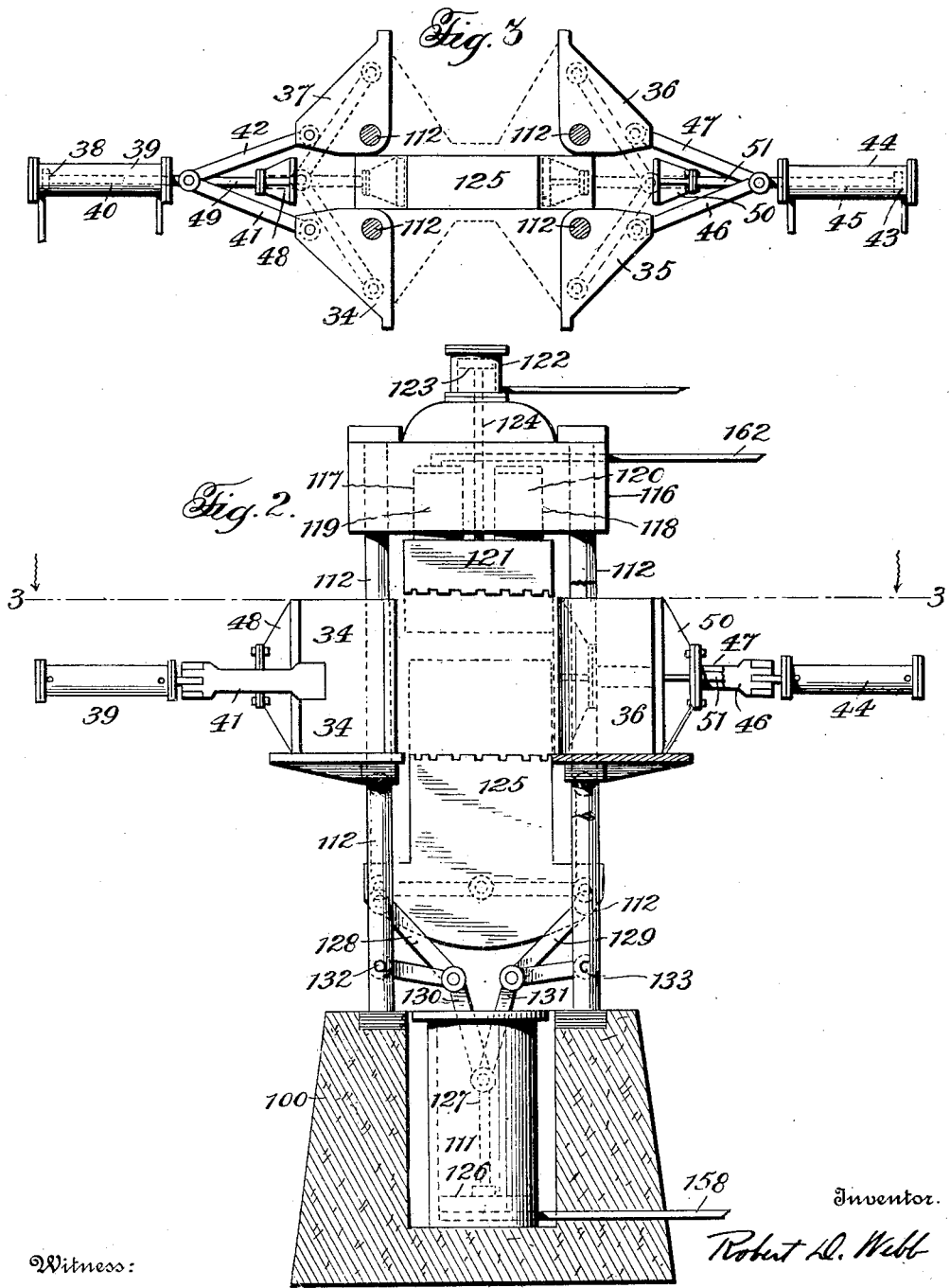

1,370,570.

Patented Mar. 8, 1921.

Witness:
Jas E Hutchinson

Inventor:
Robert D. Webb
By Foster Freeman Watson & Coit
Attorneys.

UNITED STATES PATENT OFFICE.

ROBERT D. WEBB, OF MINDEN, LOUISIANA.

PRESS.

1,370,570.

Specification of Letters Patent.

Patented Mar. 8, 1921.

Application filed January 19, 1918. Serial No. 212,676.

*To all whom it may concern:*

Be it known that I, ROBERT D. WEBB, a citizen of the United States, and residing at Minden, Webster county, State of Louisiana, have invented certain new and useful Improvements in Presses, of which the following is a specification.

This application which is in part a division of my application Number 58,390, filed October 28, 1915, patented February 26, 1918, No. 1,257,558, and also in part a division of my application Number 75,416, filed January 31, 1916, patented February 26, 1918, No. 1,257,559, relates to presses, and more particularly to devices of this type for compressing bales of cotton or other material.

In cotton districts it has been the practice to have compressing plants located at central points which take the bales as they are formed on the plantations or at the gins and compress them to a smaller size so that they take up less space on board cars and ships and at the warehouses, docks, etc. The methods of compressing the bales which have been employed heretofore were objectionable on account of the extreme pressure used on the final compression of the bale being applied while the sides are confined between the side pressure plates thereby pressing the bagging or covering into the edges or layers of cotton so that it is difficult to remove the same and also leaving the central portions of the sides of the bale exposed and also causing the edges of the layers of cotton that come in contact with the side plates to rub against the same and to be compressed so tightly that these edges are rendered very smooth, in many instances so smooth and hard that it is possible to write upon them. It has also been the practice to press the bales in from the ends at the same time that they are being pressed in from the sides practically at right angles to the end pressures, and this results in making what is called "cross-packing" and causes a larger proportion of the cotton of the bale to be accumulated at or near the ends of the bale so that the ends have a much higher density than the other portions of the bale. One of the reasons why there is a serious objection to having the cotton compressed at the ends of the bale is that the ends are the parts that are most frequently damaged, or are in damaging condition when compressed. However, it is frequently desirable to press the bales in from the ends for the purpose of making a shorter and more uniform bale than would otherwise be obtained and it will be seen that according to the present invention the pressing of the ends of the bales is accomplished progressively while the sides of the bale are being progressively pressed in from its edges toward its center, thus causing the cotton to flow freely from the end of the bale toward the center, eliminating the defects which have heretofore obtained when pressing the ends of the bale.

The principal objects of this invention are to provide a simple and dependable press with which the methods described and claimed in my said applications may be practised, and the objections and defects above mentioned overcome.

The features of the invention will be apparent from the description taken in connection with the drawings in which:

Figure 1 is a side elevation of one embodiment of the invention, the foundation and main cylinder being shown in section;

Fig. 2 is a similar elevation of another embodiment of the invention;

Fig. 3 is a sectional plan view taken substantially on the line 3—3 of Fig. 2;

Figure 4:
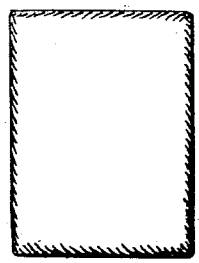
Figure 5:
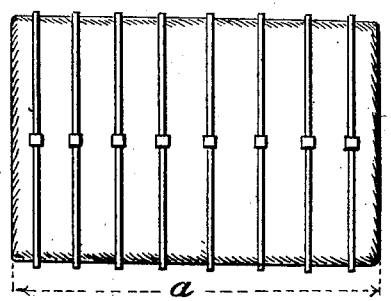
Figure 6:
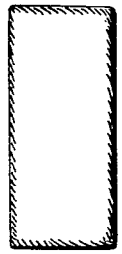
Figure 7:
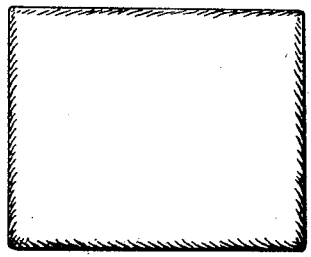
Figure 8:
Figure 9:
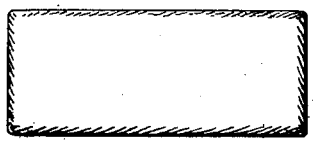
Figure 10:
Figure 11:
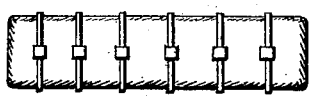
Figure 12:
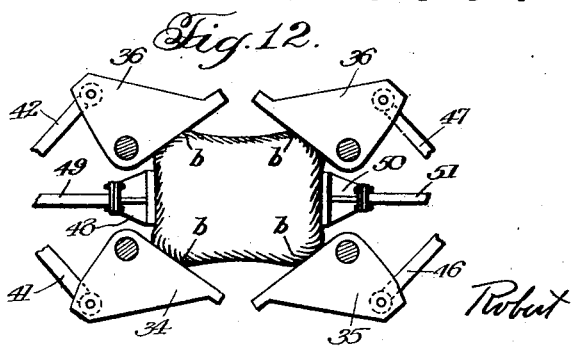

Fig. 3ª is a sectional view similar to Fig. 3 with the end pressers omitted;

Figs. 4 and 5 are respectively end and side elevations of a bale before being compressed;

Figs. 6 and 7 are respectively end and side elevations after the bale has been reformed by the side and end presser plate;

Figs. 8 and 9 are respectively end and side elevations of the bale after it has been partially compressed in a direction at right angles to the first pressures;

Figs. 10 and 11 are respectively end and side elevations of the bale after it has been further compressed in the last mentioned direction; and Fig. 12 is a diagrammatic view showing an intermediate position of the end and side pressers.

Referring to the drawings, and more particularly to Fig. 1, 10 indicates any suitable foundation which supports the main pressure cylinder 11 and the compress, said cylinder having the four vertical tie rods 12. At their upper ends these rods extend through an upper platen or head 16, upward movement of the latter being prevented by the nuts 17. Fitted within the cylinder 11 is a plunger 26 which at its upper end carries and is secured to a lower platen 25. Side doors or displacing plates 34, 35, 36 and 37 are pivoted on the rods 12 for swinging movement from the full line position to the dotted line position shown in Fig. 3, to progressively press the bale laterally. The doors 34 and 37 are actuated by a piston 38 in the cylinder 39, the piston being connected with the doors by means of a piston rod 40 and links 41 and 42. The doors 35 and 36 are similarly actuated by a piston 43 in the cylinder 44, the piston being connected with the doors by the piston rod 45 and the links 46 and 47. With the parts described the bale may be pressed in the direction of its top and bottom and upon two sides progressively from its edges toward the middle. If it is also desired to press the ends of the bale, then a plate 48 is connected with the rod 40 by means of a suitable rod 49 and is thus actuated by the piston 38 simultaneously with the doors 34 and 37 to press one end of the bale. A similar plate 50 is connected with the rod 45 by a suitable rod 51 and is actuated by the piston 43 simultaneously with the doors 35 and 36 to press the opposite end of the bale. These end pressers are therefore applied progressively while the side doors are progressively pressing in the sides of the bale. The cylinder 39 may be supported in any suitable manner. As shown it is carried from the platen 16 and the cylinder 11 by means of the rods 52 and 53. In a like manner the cylinder 44 is supported by the rods 54 and 55.

In the operation of the press a bale is placed on the platen 25. Fluid under pressure is then admitted to the cylinders 39 and 44 through the ports 56 and 57 respectively. The pistons 38 and 43 are thus forced toward each other and operate the pivoted doors and the plates 48 and 50 to press the sides and ends of the bale. As the doors swing inward toward the bale they progressively press the same from its edges toward the middle. Simultaneously the plates 48 and 50 act to progressively press the ends of the bale. After the pistons 38 and 43 have completed their strokes fluid under pressure is admitted to the cylinder 11 through the pipe 58 which causes the platen 25 to rise thereby pressing the bottom of the bale, this compression taking place while the side and end pressers are maintained against the bale. The upward movement of the platen 25 continues until it reaches a position indicated at $25^a$. The pressure of the fluid supplied to the cylinder 11 through the pipe 58 is such as to force the platen approximately only to the said dotted position. However, in order to further control the degree of compression in this direction the cylinders 39 and 44 are provided with safety valves 59 and 60 respectively which are set to release the pressure in the cylinders 39 and 44 when the bale has been compressed to the desired degree in the direction of its top and bottom. When this compression has been reached, the safety valves 59 and 60 will open thereby relieving the bale from the pressure on its sides and ends. The fluid supplied through the pipe 58 is then cut off by the valve 61 and fluid under a greater pressure admitted to the cylinder 11 from the pipe 62. This causes the platen to be moved upward thereby further compressing the bale until the platen reaches its final position indicated at $25^b$. The pistons 38 and 43 may be retracted by fluid admitted to the cylinders through ports 56' and 57' respectively. Thus it will be seen that the bale may be pressed in on its ends and sides, the pressure on the sides being applied progressively from the edges toward the middle, and while these pressures are maintained the bale may be compressed in the direction of its top and bottom to a certain degree whereupon the end and side pressures may be automatically relieved and then the bale further compressed in the direction of the last pressure, thus avoiding the objectionable feature mentioned in the second paragraph of this specification.

In some cases it is not desired to use the end pressers and they may be omitted as illustrated in Fig. $3^a$.

The press illustrated in Figs. 2 and 3 is that shown in my prior application 75,416, filed Jan. 31, 1916. Referring to these figures 100 indicates any suitable foundation which supports the pressure cylinder 111 and the rods 112. These rods carry at their upper ends a housing 116 containing the cylinders 117 and 118 in which are arranged the plungers 119 and 120 respectively. A platen 121 is rigidly connected with and actuated by plungers 119 and 120. A cylinder 122 is also arranged on the housing 116 and contains a piston 123 which is connected with the platen 121 by a rod 124, for the purpose of returning the platen after the completion of the compression movement. A lower platen 125 is suitably guided and actuated by a piston 126 in the cylinder 111 the piston having a rod 127 which is connected with pairs of toggle links 128 and 129 by the links 130 and 131 respectively. The lower link of each of the pairs 128 and 129 has a fixed pivot as indicated at 132 and the upper link of each pair is pivotally connected with the platen 125. This form of the invention is provided with side doors or displacing plates 34, 35, 36 and 37 and with the end pressers 48 and 50 in the same manner as the form shown in Fig. 1, and these parts are actuated in the same way except that no safety valves are shown on the cylinders 39 and 44.

The operation of this form of the invention is similar to that described in connection with Fig. 1 except that the side and end pressures are not automatically removed. On the contrary the supply of fluid pressure to the cylinders 39 and 49 must be manually controlled to relieve these side and end pressures. The final compression in the direction of the top and bottom of the bale instead of being applied by the movement of the platen 125 is obtained by downward movement of the upper platen 121, fluid under pressure being supplied to the cylinders 117 and 118 through the pipe 162. The cylinder 111 is supplied with fluid under pressure by the pipe 158.

It is obvious that if desired the end pressers 48 and 50 might be omitted from this form of the invention and this modified arrangement is illustrated in Fig. 3ª, this being the same press illustrated and described in my prior application 58,390, filed October 28, 1915.

The different steps in the compression of the bale are illustrated in Figs. 4 to 11 inclusive. Figs. 4 and 5 illustrate the bale in the form as placed in the press. Figs. 6 and 7 illustrate the same after the side and end pressures have been applied. Figs. 8 and 9 illustrate the same bale after the first compression in the direction of the top and bottom while the side pressures are maintained, and Figs. 10 and 11 illustrate the bale after the final compression and after it has been banded, this final compression having been applied after the side and end pressures have been released. Of course if a press were used in which the end pressers were omitted as shown by Fig. 3ª then the dimension $a$ of Fig. 5 would remain the same in the Figs. 7, 9 and 11. Otherwise the bale would be compressed in the same manner as with the press having the said end pressers.

Referring to Fig. 12 it will be seen that the pivoted doors or plates first act upon the sides of the bale at the edges of the same and the pressure is applied to the sides of the bale progressively from the end edges toward the middle of the sides. If the press is provided with the end pressers 48 and 50, then they move up and engage the ends of the bale thus coöperating with the side doors progressively to completely reassemble the cotton in the bale. In applying the initial pressure in this way in reforming the bale the cotton is pushed toward the middle of the bale, as in the manner indicated at the points $b$ in Fig. 12, and in this way a greater uniformity of cotton and density throughout the bale is secured.

Although the presses have been described in detail, it is to be understood that the invention is not limited to the specific construction shown, nor to the particular combination illustrated. For example the means for progressively pressing a side of the bale from an edge toward the middle is applicable to other forms of presses than those described.

Having thus described the invention what is claimed as new and desired to be secured by Letters Patent is:

1. A compress including in combination means for pressing the sides of a bale progressively from the edges toward the middle without changing the shape of said sides and means for pressing the bale in a direction at right angles to the first mentioned pressing.

2. A compress including in combination means for compressing the sides of a bale progressively from the edges toward the middle without changing the shape of said sides and means for simultaneously compressing the bale in a direction at right angles to the first mentioned pressure.

3. A compress including in combination means for compressing the opposite sides of a bale progressively from the end edges toward the middle, means for compressing the ends of the bale, and means for compressing the remaining sides.

4. A compress including in combination means for compressing the opposite sides of a bale progressively from the end edges toward the middle, means for simultaneously compressing the two opposite ends of the bale and means for compressing the remaining sides or top and bottom of the bale.

5. A compress including means for compressing a pair of opposite sides of a bale progressively from the end edges toward the middle without changing the shape of said sides.

6. A compress including in combination, means for compressing a bale in one direction, means for compressing the bale in a direction at right angles to the first direction, and means for releasing said first pressing when the compression of the bale due to the second pressing reaches a predetermined amount.

7. A compress including in combination means for compressing a bale in one direction, means for compressing the bale in another direction while the first pressing is maintained, and automatic means for releasing said first pressing when the compression of the bale reaches a predetermined amount.

8. A compress including in combination, means for compressing a bale in one direction progressively from the edges toward the middle and maintaining said pressing, means for compressing the bale in another direction, and means for releasing said first pressing when the compression of the bale reaches a predetermined amount.

9. A compress including in combination means for compressing a bale in one direction from its edges toward the middle without changing the shape of said sides including plates pivoted to swing about axes, each parallel to an adjacent edge of the bale.

10. A compress including in combination a movable platen, means for moving said platen to compress a bale in the direction of its top and bottom, a cylinder having a piston reciprocable in a path at approximately a right angle to the direction of movement of said platen, and means operated by said piston for pressing an end and side of said bale.

11. A compress including in combination a movable platen, means for moving said platen, a cylinder having a piston movable in a path at right angles to the direction of movement of said platen, and means operated by said piston for progressively pressing a bale in a direction at right angles to the path of said piston and also in a direction parallel to said path.

12. A compress including in combination a movable platen, means for moving said platen, a cylinder having a piston movable in a path at right angles to the direction of movement of said platen, and means operated by said piston for compressing a bale in a direction at right angles to the path of said piston progressively from an edge of the bale toward the middle.

13. A compress including in combination, means for compressing a bale on its sides progressively from the end edges toward the middle of said side, means for compressing the bale at right angles to said first pressing, and automatic means for releasing said first pressing when the compression reaches a predetermined value.

14. A compress including in combination, means for compressing a bale in one direction, and means for compressing the bale in another direction including presser plates pivoted to swing about axes parallel to said first direction.

15. A compress including in combination a movable platen, means for moving said platen, a cylinder having a piston reciprocable in a path at an angle to the direction of movement of said platen, and means operated by said piston for compressing a bale on said platen in two directions.

16. A compress including in combination a movable platen, means for moving said platen, a cylinder having a piston movable in a path at right angles to the direction of movement of said platen, and means operated by said piston for compressing a bale in a direction at right angles to the path of said piston.

17. A compress including in combination, a movable platen, means for moving said platen, four parallel rods arranged at the corners of a rectangle inclosing said platen, a presser plate pivoted on each rod to swing to and from the platen and means for swinging the plates.

18. A compress including in combination, a base, a stationary top platen, four parallel rods connecting said platen and base, a bottom platen movable toward the top platen, means for moving said bottom platen, a presser plate pivoted on each rod to swing to and from the bottom platen and means for swinging said plates.

19. A compress including in combination, means for compressing a bale in one direction, four rods parallel to said direction arranged at the corners of a rectangle, means for compressing the bale in a second direction at right angles to said first direction including a plate pivoted on each rod and means for compressing the bale in a direction at right angles to said first and second directions.

In testimony whereof I affix my signature.

ROBT. D. WEBB.